United States Patent [19]

Streater et al.

[11] Patent Number: 4,494,180
[45] Date of Patent: Jan. 15, 1985

[54] ELECTRICAL POWER MATCHING SYSTEM

[75] Inventors: August L. Streater, Bluffton; Daniel T. Dwyer, Fort Wayne, both of Ind.

[73] Assignee: Franklin Electric Co., Inc., Bluffton, Ind.

[21] Appl. No.: 557,070

[22] Filed: Dec. 2, 1983

[51] Int. Cl.$^3$ ............................................. H02M 5/45
[52] U.S. Cl. ..................................... 363/37; 363/101; 318/801; 323/906
[58] Field of Search ................... 363/9, 10, 34, 36, 37, 363/41, 43, 101; 323/906; 318/800, 801

[56] References Cited

U.S. PATENT DOCUMENTS

| | | | |
|---|---|---|---|
| 3,384,806 | 5/1968 | Hartman | 323/906 X |
| 3,626,198 | 12/1971 | Boehringer | 323/20 |
| 4,004,209 | 1/1977 | Lawson, Jr. | 363/37 |
| 4,175,249 | 11/1979 | Gruber | 323/15 |
| 4,200,833 | 4/1980 | Wilkerson | 323/283 |
| 4,204,147 | 4/1980 | Larrabee | 363/17 |
| 4,272,806 | 6/1981 | Metzger | 363/21 |
| 4,274,044 | 6/1981 | Barre | 363/18 |
| 4,316,132 | 2/1982 | Geppert | 318/723 |
| 4,333,136 | 6/1982 | Baker | 363/43 |
| 4,375,662 | 3/1983 | Baker | 323/906 X |
| 4,390,940 | 6/1983 | Corbefin et al. | 363/132 |
| 4,404,472 | 9/1983 | Steigerwald | 363/80 |

FOREIGN PATENT DOCUMENTS

| | | | |
|---|---|---|---|
| 3144694 | 5/1983 | Fed. Rep. of Germany | 323/906 |
| 3212022 | 10/1983 | Fed. Rep. of Germany | 323/906 |
| 2111691 | 7/1983 | United Kingdom | 323/906 |

OTHER PUBLICATIONS

"Dynamic Behavior of a Class of Photovoltaic Power Systems" by O. Wasynczuk, IEEE Transactions on Power Apparatus and Systems, vol. Pas-102, No. 9, Sep. 1983, pp. 3031-3037.

"Maximum Power Trackers for Photovoltaic Arrays" by E. E. Landsman, 13th IEEE Photovoltaic Specialists Conference-1978, Washington, D.C., U.S.A., (Jun. 5-8, 1978), pp. 996-1000.

Franx, "A New Approach to Solar Pump Systems Using Submersible Motors", Photovoltaic Solar Energy Conference, Berlin, W. Germany, Apr. 1979, pp. 1038-1046.

Becker, "Designing Microprocessor-Controlled PWM Inverters", Proceedings of Powercon 5, Fifth National Solid State Power Conversion Conference, San Francisco, CA, USA, (May 4-6, 1978), D3-1-6.

Kapustka, et al., "A Programmable Power Processor for a 25 KW Power Module", PESC 1978 Record, Syracuse, N.Y., USA, (Jun. 13-15, 1978), pp. 76-80.

Corbett, "Development of High Voltage High Power Satellite Power Systems", Proceedings of the 13th Intersociety Energy Conv. Engineering Conference, San Diego, CA, USA, (Aug. 20-25, 1978), pp. 37-43.

Pickrell et al., "An Inverter/Controller Subsystem Optimized for Photovoltaic Applications", Thirteenth IEEE Photovoltaic Specialists Conference-1978, Washington, D.C., USA, (Jun. 5-8, 1978), pp. 984-991.

*Primary Examiner*—William M. Shoop
*Assistant Examiner*—Judson H. Jones
*Attorney, Agent, or Firm*—Marshall, O'Toole, Gerstein, Murray & Bicknell

[57] ABSTRACT

This disclosure relates to an electrical power transfer system for matching a load to a DC source such as a solar array. The system tracks the power output of the source under varying operating conditions and matches the load to the source to maintain peak power conditions. The system senses the voltage and the current of the source, incrementally changes the volt-ampere operating point of the source and thereby changes its incremental resistance, and adjusts the load to the level where the ratio of the DC source voltage to the DC source current is substantially equal to the incremental resistance.

20 Claims, 6 Drawing Figures

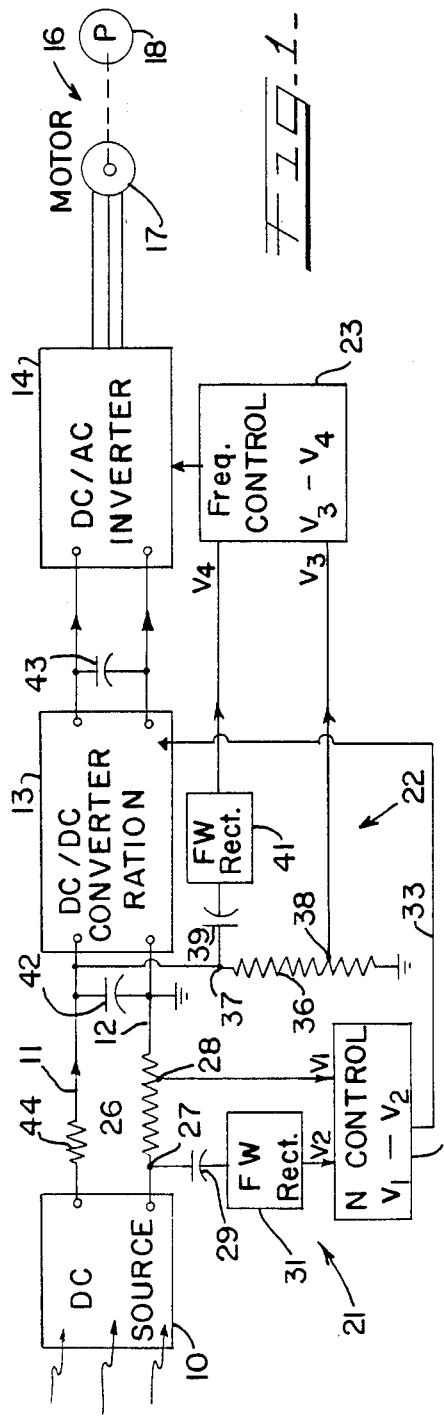
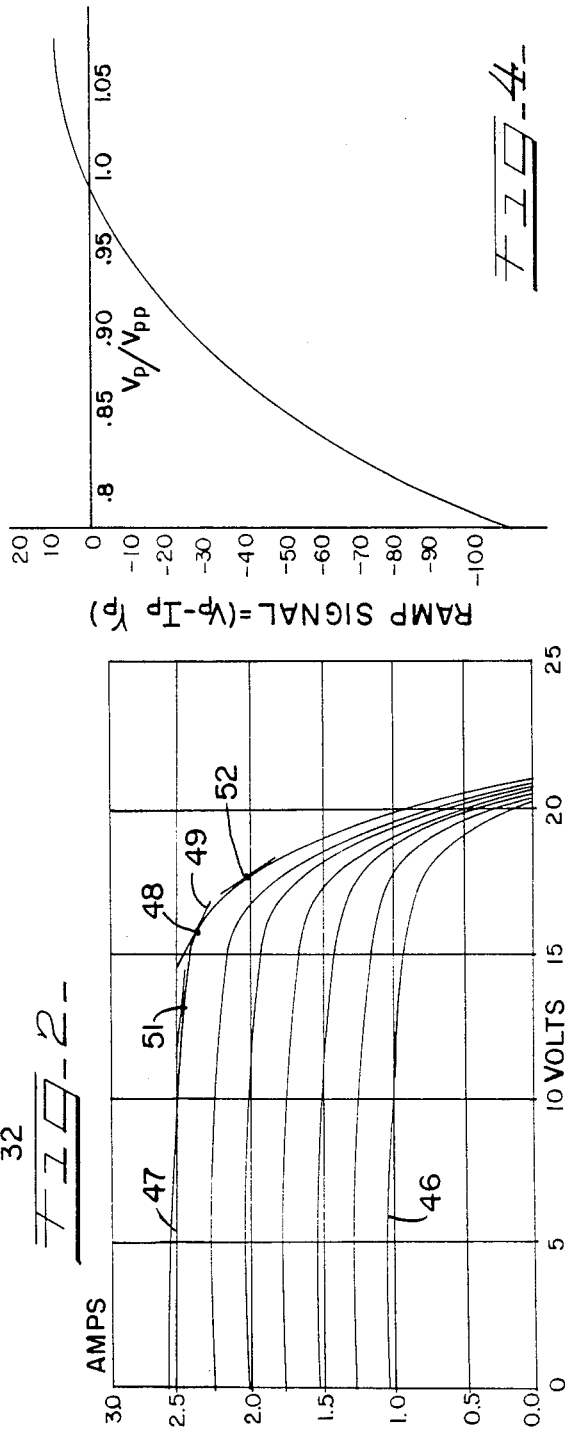

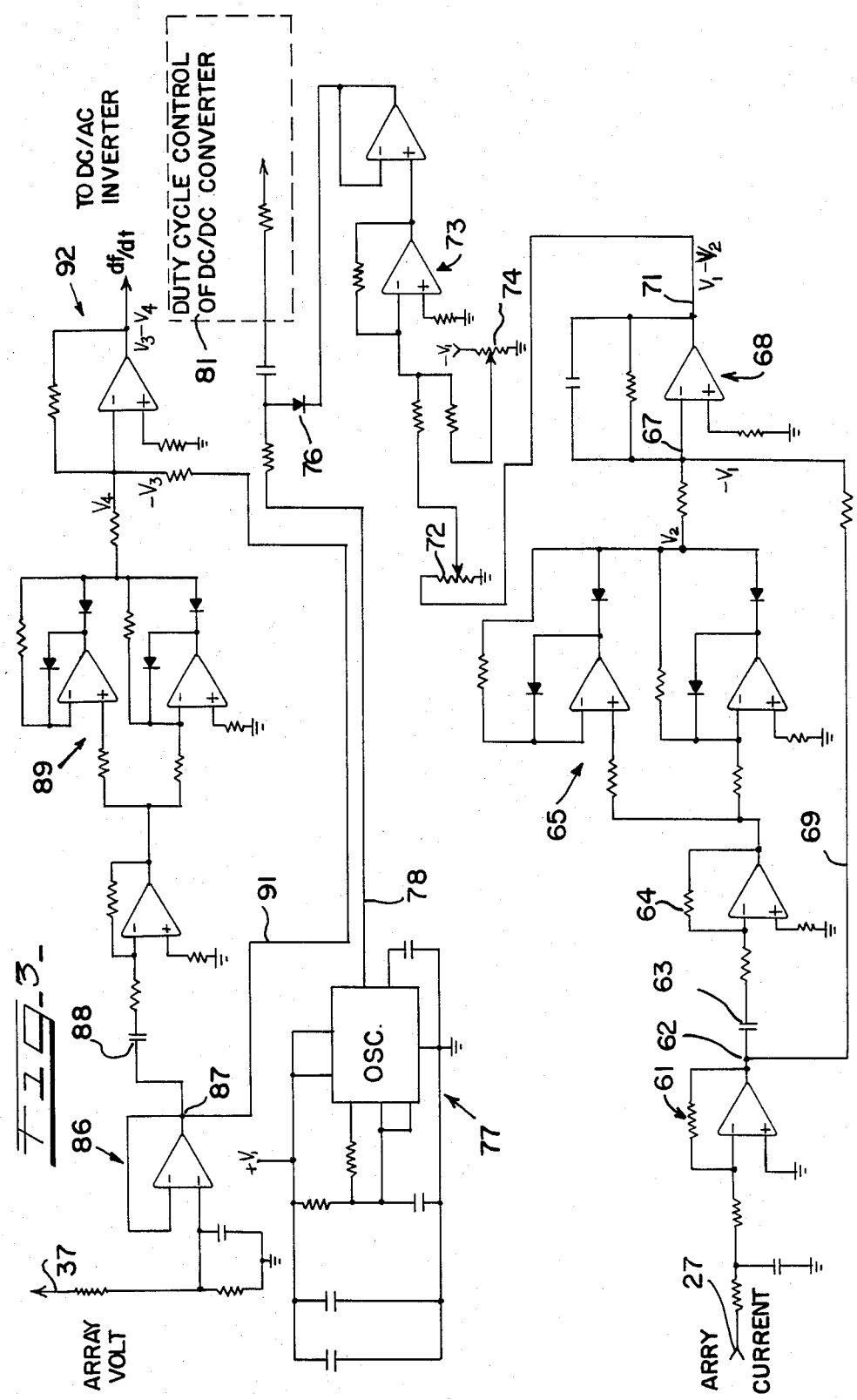

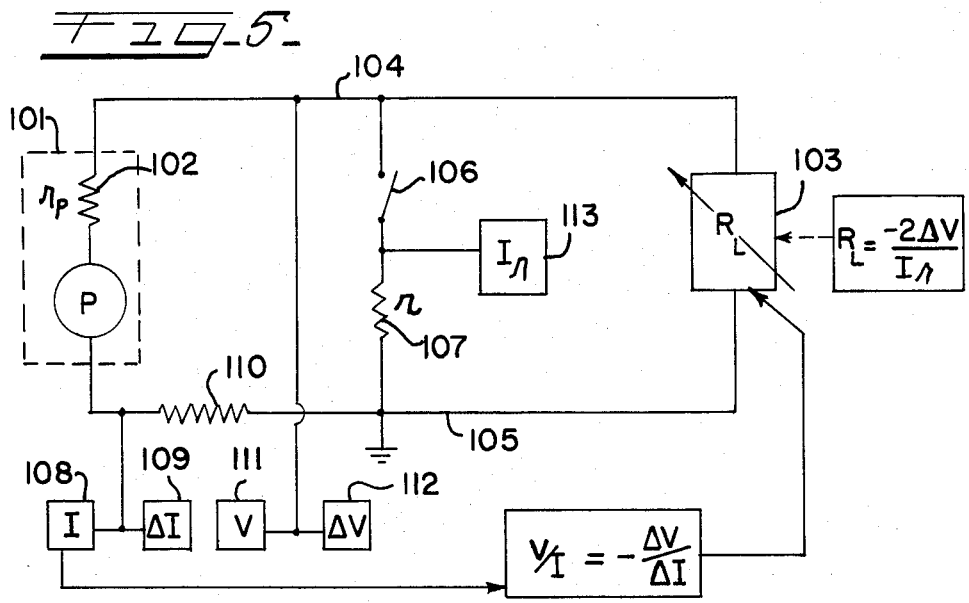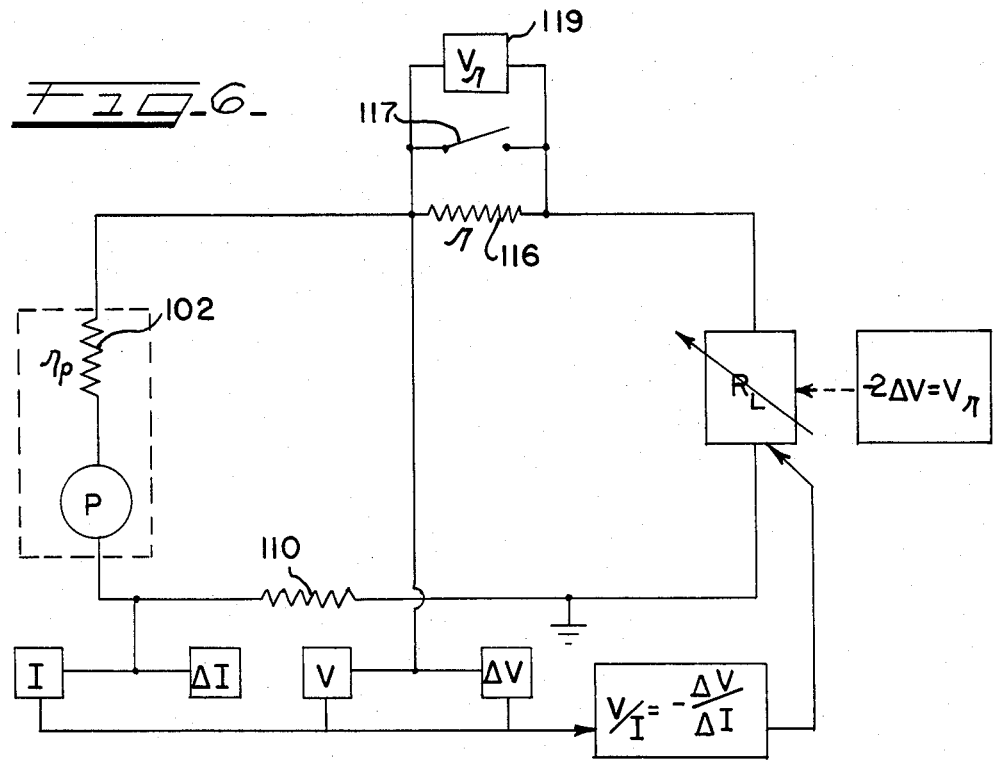

ELECTRICAL POWER MATCHING SYSTEM

This invention relates to solar power systems, and more particularly to apparatus for operating a photovoltaic array at maximum power transfer conditions.

BACKGROUND OF THE INVENTION

In recent years, the use of solar energy has become increasingly important as an alternate source of energy. Such a system is useful in an area having plentiful sunlight but little conventional energy resources. However, a photovoltaic array having a useful capacity is relatively expensive, and it is therefore important that it be operated at maximum efficiency conditions.

Numerous systems have been proposed and utilized for extracting the maximum power available from an array under varying conditions. As is well known, the available power varies with changes in the solar radiation level and the ambient temperature, and such systems include a power matcher for operating the system at peak power conditions. Prior art power matchers include the use of a temperature compensated reference voltage, the use of a pilot or reference photovoltaic cell, and means for measuring the power over a range of power outputs and then adjusting the system to the peak power point.

These foregoing prior art systems have the disadvantage that they only approximate the peak power point, or that their response time is too slow to make them usable in all types of power systems.

It is a general object of the present invention to provide an improved power matching system that is operable under various conditions, accommodates various arrangements of photovoltaic cells, and responds rapidly to changes in operating conditions.

SUMMARY OF THE INVENTION

A system in accordance with the present invention is particularly useful in connecting a power source such as a photovoltaic array to a load such as a synchronous electric motor. The system comprises means for sensing the voltage and the current of the source, means for adjusting the value of the load, means for incrementally changing the volt-ampere operating point of the source and thereby its incremental resistance, and control means responsive to said voltage, said current and said incremental resistance, and connected to said load adjusting means for adjusting said load to the level where the ratio of DC voltage to current is substantially equal to the incremental resistance.

BRIEF DESCRIPTION OF THE DRAWINGS

The invention will be better understood from the following detailed description of specific examples of the present invention, the examples being shown in the figures of the accompanying drawings wherein:

FIG. 1 a block diagram of a system embodying the present invention;

FIG. 2 shows curves illustrating the operation of the system;

FIG. 3 is a schematic diagram of a circuit according to a preferred embodiment of the invention;

FIG. 4 shows another curve illustrating the operation of the invention;

FIG. 5 is a diagram of an alternate form of the invention; and

FIG. 6 is a diagram of still another alternate form of the invention.

DETAILED DESCRIPTION OF THE DRAWINGS

FIG. 1 illustrates a system in accordance with this invention and comprises a DC source such as a panel or array 10 of, for example, crystal silicon photovoltaic cells. The panel is connected by lines 11 and 12 to a DC/DC converter 13, such as a buck converter, having a voltage ratio $V_{out}/V_{in}=N$ (or $I_{in}/I_{out}=N$). A DC/AC inverter bridge 14 is connected between the converter 13 and a load 16 such as a synchronous motor 17 coupled to drive a centrifugal pump 18. The speed of the motor 17 is a function of the frequency of the AC output of the inverter 14, and the load imposed by the pump 18 is a function of its speed. Thus, the load of the system may be controlled by adjusting the frequency of the inverter.

The system further includes a circuit 21 for sensing the panel current $I_p$, a circuit 22 for sensing the panel voltage $V_p$, and a circuit 23 for controlling the frequency of the inverter 14 and, thereby, the value of the load. The current sensing circuit 21 includes a current resistor 26 having two taps 27 and 28. The tap 27 is connected to a capacitor 29 which blocks the DC current component but passes an AC current to be described, a full-wave rectifier 31, and a circuit 32 which receives the rectified current signal and the signal from the tap 28. The output of the control circuit 32 is connected by a line 33 to an input of the converter 13 and, as will be described, controls the conversion ratio N. The voltage sensing circuit 22 includes a voltage resistor 36 connected between the line 11 and ground, the resistor 36 also having two taps 37 and 38. The tap 37 is connected to capacitor 39, and a full-wave rectifier 41 is connected between the capacitor 39 and the control circuit 23. The tap 38 is connected directly to the control 23.

Capacitors 42 and 43 are connected across the lines 11 and 12 on opposite sides of the converter 13, and a resistor 44 in the line 11 represents the small signal AC panel resistance $r_p$.

Before discussing the operation of the system, reference is made to FIG. 2 which shows volt-ampere curves for different solar radiation (insolation) levels of the panel 10 at a particular temperature. The numerals 46 and 47 indicate low and high insolation levels, respectively. The voltage and current values shown in FIG. 2 are, of course, only examples. The source 10 has a nonlinear voltage-current characteristic as shown, and different load magnitudes result in operation of the system at different positions on any given curve.

It is important for optimum utilization of the system that it always operate at the peak power point (PPP). As in other types of systems, this occurs when the load resistance is equal to some optimum value. Since this optimum load resistance changes with the panel temperature and the solar radiation level, to achieve and maintain maximum power transfer it is necessary to constantly adjust the motor load. As previously mentioned, the motor 17 drives the centrifugal pump 18 and the load on the motor is a function of its speed which, in turn, is a function of the AC frequency (for a synchronous motor). Thus the load is adjusted to match the panel maximum power point by changing the inverter frequency.

An important aspect of this invention is the discovery that the peak power point is that point on the panel curve, such as one of the curves shown in FIG. 2, at which the ratio of $I_p$ to $V_p$ is equal to the negative of the slope of the IV curve. This occurs at the knee of the curve 47 at substantially the point 48. This may also be stated as $V_p = I_p r_p$ where $V_p$ and $I_p$ are the DC voltage and current of the panel 10 and $r_p$ is the resistance 44 for a small incremental change in the current at the operating point on the curve. At the point 48, for example, the DC voltage is approximately 16 volts and the current is approximately 2.4 amps. Thus the ratio 2.4/16 equals the negative of the slope or tangent 49 at the maximum or peak power point 48. If the system were operating at the point 51 or at the point 52, for example, the above equality would not exist and maximum use would not be made of the system.

As previously mentioned, the control 23 operates to adjust the frequency of the inverter 14 to achieve the peak load point. Where a synchronous motor 17 is being powered, the motor speed follows the inverter frequency, and it is important that the frequency be changed slowly when an adjustment is made. If the frequency were changed rapidly, the motor 17 might not be able to change its speed at the same rate, and accordingly it might be pulled "out of synch" and stop. To prevent such an occurrence the variation, or ramp, of the frequency f with time is made gradual.

In the present system, the load is ramped or varied in accordance with the equation $dp/dt = A_o(V_p - I_p r_p)$, where P is the load imposed on the panel, $A_o$ is a constant and the other terms are as previously defined. This is achieved by programming the frequency control chip of the inverter 14, which varies the frequency in response to a control voltage from the circuit 23, to operate according to this equation. The peak power point was earlier defined as $V_p = I_p r_p$, and consequently $dp/dt = 0$ at the peak power point. At loads less than maximum, $dp/dt$ is positive; and at loads greater than maximum, $dp/dt$ is negative. FIG. 4 shows this ramp signal plotted against the ratio $V_p/V_{pp}$ where $V_p$ is the voltage at the actual operating point and $V_{pp}$ is the voltage at the peak power point. It will be noted that when $V_p = V_{pp}$, the ramp signal equals zero.

As mentioned, the criterion for operation at the peak power point is $V_p/I_p = r_p$, and $V_p$ and $I_p$ may readily be measured. The small-signal AC resistance $r_p$ of the panel 10 could be determined by injecting a small AC current into the panel or by superimposing a small AC voltage on the panel DC voltage, measuring the AC components of the voltage and current, and determining their ratio to obtain $r_p$. Such arrangements are shown in FIGS. 5 and 6. The system shown in FIGS. 1 and 4, however, accomplishes the same end without explicitly determining $r_p$.

It is an important feature of this invention that the voltage of the panel 10 is modulated and the frequency of the inverter 14 is controlled in a novel and advantageous manner. The DC/DC converter 13, which is a buck converter, switches the panel DC voltage at a converter switching frequency to produce an alternating signal having an adjustable duty cycle. The voltage ratio $N = V_{out}/V_p$ of the converter 13 is essentially equal to the duty cycle, and therefore N may be adjusted by changing the duty cycle. The output filter capacitance 43 of the converter 13 is substantially larger than the capacitance 42 across the panel 10, and, at a modulating frequency to be described hereinafter, the reactance of the capacitor 43 is much less than $r_p$. Consequently a small change in the converter 13 duty cycle produces a proportional change in the panel 10 voltage. Further, because of the relatively large filter capacitor 43, the output voltage $V_{out}$ of the converter 13 is approximately constant at the frequency of modulation. As a result, $\Delta V_p = -\Delta N \, V_{out}/N^2$, and $\Delta V_p = -V_p/N \, \Delta N$, where $\Delta N$ is a small change in N and represents a small signal AC component of the converter ratio $N = V_{out}/V_p$. The DC panel voltage and current are thus modulated by modulation of the buck converter ratio, N, which in turn is modulated by modulation of the switching duty cycle. While these relations are approximations, they are sufficiently accurate to closely match the power in the present system.

In the specific example of the invention shown in FIGS. 1 and 3, the switching frequency of the converter 13 is approximately 10,000 Hz, and the modulation of the duty cycle is at approximately 300 Hz.

With specific reference to FIG. 1, the panel current, including the DC component and the AC modulating component, flows through the resistor 26. The DC component is blocked by the capacitor 29, and the AC component is rectified and is indicated by the notation $V_2$. A percentage k of the full panel current, comprising essentially the DC component, is represented by the voltage $V_1$ on the tap or terminal 28. The control circuit 32 subtracts $V_2$ from $V_1$, and the difference, or error signal, is fed back in the line 33 to the converter 13. The modulating circuit in the converter 13 adjusts by servo action, the modulation of the duty cycle in order to null the quantity $(V_1 - V_2)$ and thereby maintain the percent modulation of the panel current constant. The terminal or tap 28 is located to provide k of approximately 5% peak-to-peak modulation of the current when $V_1 = V_2$.

Similarly the panel voltage $V_p$ appears across the resistor 36. The AC component at the terminal 37 is rectified and is indicated by $V_4$. The percentage k of the full voltage at the terminal 38 is indicated at $V_3$, and the control 23 subtracts $V_4$ from $V_3$. The percentage k of total voltage sensed at the tap or terminal 38 is identical with the percentage k of total current sensed at the terminal 28. The difference between $V_3$ and $V_4$ represents the resulting deviation in the percent modulation of $V_p$, and it is fed to the inverter 14 and serves as the load ramp control signal.

It was previously mentioned that load ramp control signal of the inverter 14 is represented by the equation $dp/dt = A_o(V_p - I_p r_p)$. It can be shown mathematically that, when the feedback loop including the control 32 operates on $\Delta N$ to maintain $V_2$ substantially equal to $V_1$ at all operating points of the operating curve, such as curve 47 of the panel, then $V_3 - V_4 = k(V_p - I_p r_p)$. The right-hand term, of course, is the same as the load ramp control signal previously discussed and shown in FIG. 4, and the system operates to maintain $V_3 - V_4 = 0$ where the system is at the peak power point. If the insolation level increases, $V_3 - V_4$ becomes positive and increases the inverter frequency and hence the motor speed; this action changes the operating point on the curve 47 to achieve $V_3 = V_4$.

A circuit for continuously maintaining the system at the peak power operating point is shown in FIG. 3. The circuit of FIG. 3, which is the preferred embodiment of the invention, has a slightly different construction from that of FIG. 1 but its operation is essentially the same.

A voltage representing the array current appears at terminal 27 and passes through a buffer amplifier 61; the amplifier 61 output branches at point 62, and one branch includes a capacitor 63, an amplifier 64 and a full wave rectifier 65. The capacitor 63 and the rectifier 65 function the same as the capacitor 29 and the rectifier 31 in FIG. 1. The output voltage $V_2$ of the rectifier 65 represents the panel AC current and it is fed to an input 67 of a summing amplifier 68.

The other branch from the point 62 is fed on a line 69 to the same input 67, and this signal-$V_1$ represents the panel DC current. The difference ($V_1 - V_2$) appears at the output 71 of the amplifier 68.

The AC panel current is much smaller than the DC panel current, and in the arrangement shown in FIG. 1, they are brought to equality by locating the tap 28 so that it sees only a small proportion, such as 5%, of the total current. The same result is achieved in FIG. 3 by branching the signal at the point 62 and then amplifying the AC current signal in the amplifier 64 by a factor of approximately twenty. In both circuits the two current components are made approximately equal, and the difference or error signal, if any, appears at the input 67 and is amplified and passed to the output 71. This error signal is passed through a variable resistor 72 to a summing amplifier 73. A zero-offset variable resistor 74 adjusts the magnitude of the other input to the summing amplifier 73. The output of amplifier 73 is fed to the cathode of a diode 76.

A square wave generator 77 produces a square wave having a 50% duty cycle on a line 78 which is connected to the anode of the diode 76. The voltage level at the output of the circuit 73 and on the cathode of the diode 76 controls the amplitude of the square wave pulses which are fed on a line 79 to a control circuit 81 for the converter 13.

This converter 13 is a type known as a buck converter, and as previously described it converts an input DC voltage to a different level output DC voltage by repetitive switching between the input voltage and an inductor connected to the output. The switching frequency may be on the order of 10,000 Hz, and the voltage ratio of the converter is a function of the duty cycle (% on-time) of the switch. The converter includes the input 79 and the switch duty cycle is varied in accordance with the magnitude of the voltage on the input 79. Thus, the duty cycle is changed or modulated at the 300 Hz frequency of the signal on the input 79, and the difference between the two values of the duty cycle depends on the magnitude of the square wave pulses at the input 79. The control 81 of the converter adjusts the duty cycle which, as previously mentioned, changes the panel AC current component and the value of $V_2$, which, in turn, controls the control 81. The feedback loop thereby operates to hold $V_1$ equal to $V_2$.

The panel voltage signal appears at the terminal 37 and passes through a buffer amplifier 86. The signal branches at the point 87, and the AC component passes through a capacitor 88 and a full wave rectifier 89, whereas the DC component passes through a line 91. A summing amplifier 92 combines $V_4$ and $V_3$ and produces an output signal ($V_3 - V_4$). This panel voltage circuit is constructed and operates similarly to the panel current circuit described above.

The output signal ($V_3 - V_4$) is fed to a chip in the inverter 14 which may be a conventional six step inverter. The inverter output forms a three-phase AC power supply for the motor 17. The motor is a synchronous AC motor and its speed is controlled by the inverter output frequency which, in turn, is controlled by the signal ($V_3 - V_4$). As previously described, the motor speed controls the value of the load and holds it at the value to extract maximum power from the panel 10.

FIGS. 5 and 6 show alternate forms of the invention. With reference first to FIG. 5, a DC power source 101, such as a solar panel, having a nonlinear voltage-ampere characteristic includes an internal resistance $r_p$ indicated by the numeral 102, and it is connected across an adjustable load $R_L$ 103. Connected across the power lines 104 and 105 is a parallel branch including a switch 106 and a test resistor r 107 which has a high value as compared with $R_L$.

When the switch 106 is open, a source voltage V (which is essentially equal to the load voltage) exists across the lines 104 and 105 and a source current I flows through the circuit. When the switch 106 is closed, there is a slight change in the load; the line voltage becomes $V + \Delta V$ and the load current becomes $(V + \Delta V)/R_L$, where V is the source voltage and $\Delta V$ is the change in the source voltage.

As previously described, at the peak power point, or maximum power transfer point, $\Delta I/\Delta V = -I/V$, and this relation is valid in the FIG. 5 circuit because the test resistance r is very large compared to $R_L$ and consequently the changes in the voltage and current are very small. $\Delta I/\Delta V$ therefore approximates the derivative of the conductance of the source 101. The source current I and the incremental current $\Delta I$ are sensed by components 108 and 109 connected across a current resistor 110 in the line 105, which is very small compared with $r_p$ and $R_L$, and the source voltage V and incremental voltage $\Delta V$ are sensed by components 111 and 112 connected across the lines 104 and 105. Thus, $R_L$ may be adjusted to make $\Delta I/\Delta V = -I/V$ as previously described.

Further, it can be shown that $$\Delta I = I_r + \Delta V/R_L$$

where $I_r$ is the current through resistor 107. Also, $$\Delta I/\Delta V = -I/V = -1/R_L = I_r/\Delta V + 1/R_L, \text{ and}$$

$$I_r = -2\Delta V/R_L \text{ and } R_L = -2\Delta V/I_r$$

The last equation shows that the current through resistor 107 equals the negative of twice the change in load current at the peak power point, and accordingly the load may be adjusted to achieve this equality. A sensor 113 senses $I_r$.

The load $R_L$ in FIGS. 5 and 6 may be a DC load or it may include an inverter and an AC load, as shown in FIG. 1. The switch 106 and the resistor 107 may, of course, be formed by electronic components which periodically produce a small current change in the test branch.

The circuit shown in FIG. 6 is similar to that of FIG. 5, but in FIG. 6 the test resistor 116 is connected in series with the source and the load, and a switch 117 is connected across the resistor 116. The resistor 116 has a very low value compared with the load $R_L$.

When the switch 117 is closed, the voltage is V and the current is I, and when the switch 117 is opened there is a slight change in panel voltage to $V + \Delta V$ and the current through $R_L$ to $(V + \Delta V)/(R_L + r)$.
Further, $$I + \Delta I = (V + \Delta V)/(R_L + r) \text{ and}$$

$$Ir + (\Delta I)R_L + (\Delta I)r = \Delta V$$

since $$\Delta I/\Delta V = -I/V = -1/R_L, \text{ then}$$

$$-2\Delta V = r(I + \Delta I) \text{ or } -2\Delta V = V_r$$

Consequently the voltage $V_r$ (measured by a circuit 119) across the test resistor 116 is equal to the negative of twice the change in the source voltage when the system is operating at the maximum power transfer point.

It will be apparent that a novel and useful system has been provided. It operates to maintain the system at the maximum power transfer point despite changes in operating conditions, and it responds relatively quickly to such changes. This last factor is important where the load is a synchronous motor which may drop out of synchronism if the frequency does not quickly follow changes in conditions. The system is usable with different types of DC power sources and loads. In the instance when the source is a solar panel, no adjustment is needed for varying numbers of series or parallel array modules. Further, the system is not sensitive to the solar cell characteristics, operating temperature, insolation level or dirt accumulation, because the system functions by sensing the panel voltage and current. Loads other than an AC synchronous motor may, of course, be used. For example, in FIG. 1 the load may include a brushless DC motor, in which case the inverter 14 would be deleted and the control circuit 23 would be constructed and connected to adjust the DC output voltage of the converter 13. The control circuit 23 in such a construction would be an average ratio control connected to adjust the ratio N of the converter 13.

What is claimed is:

1. Apparatus for operating a system at the maximum power transfer point, the system including an adjustable load, a direct current power source that has a nonlinear voltage-current characteristic and lines connecting the load to the source, said apparatus comprising first means adapted to be connected to said lines for producing a relatively small change in the current in said source and said lines, second means adapted to be connected to said lines for sensing the source DC current and said change in current, third means adapted to be connected across said source and sense said source DC voltage and the change in voltage caused by said change in current, and fourth means connected to said second and third means and adapted to be connected to said adjustable load to vary said load to maintain the relation $V/I = -\Delta V/\Delta I$, where V and I are the direct current voltage and current of the source, and $\Delta V$ and $\Delta I$ are the changes in the voltage and current.

2. Apparatus according to claim 1, wherein said first means includes a DC-DC converter, and means for modulating the voltage ratio of said converter.

3. Apparatus according to claim 2, wherein said converter is a buck converter, and said modulating means varies the duty cycle of said converter.

4. Apparatus according to claim 1, wherein the load includes a synchronous AC motor, and said fourth means comprises a DC-AC inverter and means to vary the frequency of the output voltage of said inverter.

5. Apparatus according to claim 1, wherein said first means comprises a branch adapted to be connected across said lines in parallel with the source, said branch including a relatively large resistor and a series connected switch.

6. Apparatus according to claim 1, wherein said first means comprises a relatively small resistor adapted to be connected in one of said lines in series with said source, and a switch connected in parallel with said resistor.

7. Apparatus for operating a system at the maximum power point, the system including a DC power source that has a nonlinear voltage-current characteristic, and a synchronous motor, said apparatus comprising a DC-DC buck converter adapted to be connected across said source, a DC-AC inverter connected to the output of said converter and adapted to be connected to supply power to the motor, said inverter including circuit means for adjusting the output frequency thereof and therefore the load of the motor, first circuit means adapted to be connected to said lines and to sense the source DC voltage and current, second circuit means connected to said converter and modulating the duty cycle and therefore the voltage ratio of said converter, said modulation of said converter inducing a relatively small AC current and voltage in said source, third circuit means adapted to be connected to said lines and to sense said AC current and voltage, fourth circuit means connected to receive the DC and AC currents from said first and third circuit means and connected to said second circuit means for controlling said modulation to maintain the DC current in a predetermined relation to the AC current, and fifth circuit connected to receive the DC and AC voltages from said first and third circuit means and connected to said inverter for adjusting said frequency to maintain the DC voltage in a predetermined relation to the AC voltage.

8. Apparatus as in claim 7, and further including a relatively large capacitor connected across the output of said converter.

9. Apparatus as in claim 8, wherein the source is a panel of photovoltaic cells.

10. Apparatus for operating a system at the maximum power point, the system including a DC power source that has a nonlinear voltage-current characteristic, and a load, said apparatus comprising a converter adapted to be connected across said source, first adjustable circuit means connected to the output of said converter and adapted to be connected to supply power to the load, said first circuit means being adjustable to vary the level of the load, second circuit means adapted to be connected across said source and to modulate the source current at a substantially constant first percentage of the source current, and third circuit means adapted to be connected across the source and operable to adjust said first circuit means and thereby the load at the level where the modulation voltage is a substantially constant second percentage of the source voltage.

11. Apparatus as in claim 10, wherein said first and second percentages are substantially equal.

12. Apparatus as in claim 10, wherein said converter comprises a DC to DC converter, and said second circuit means varies the voltage ratio of said converter and thereby modulates the source current.

13. Apparatus as in claim 10, wherein said first circuit means comprises a DC to AC inverter and means to adjust the frequency of the AC and thereby the level of the load.

14. Apparatus for operating a system at the maximum power transfer point, the system including an adjustable load, a direct current power source that has a nonlinear voltage-current characteristic and lines connecting the load to the source, said apparatus comprising parallel branch means adapted to be connected across said lines in parallel with the source and the load for producing an incremental change in the voltage of said source, first means adapted to be connected to said lines for sensing the incremental voltage, second means connected to said branch means and sensing the current in said branch means, and third means connected to said first and second means and adapted to be connected to said adjustable load to vary said load to substantially maintain the relation $R = -2\Delta V/I$, where I is the current in said branch means, $\Delta V$ is the incremental voltage, and R is value of the load.

15. Apparatus for operating a system at the maximum power transfer point, the system including an adjustable load, a direct current power source that has a nonlinear voltage-current characteristic and lines connecting the load to the source, said apparatus comprising first means adapted to be connected in said lines in series with the source and the load for producing an incremental change in the voltage in said source and said lines, second means adapted to be connected to said lines for sensing the incremental voltage, third means connected to said first means and sensing the voltage across said first means, and fourth means connected to said second and third means and adapted to be connected to said adjustable load to vary said load to substantially maintain the relation $-2\Delta V = V_r$, where $V_r$ is the voltage across said first means, and $\Delta V$ is the incremental voltage of the source.

16. A power system comprising an adjustable load, a direct current power source that has a nonlinear voltage-current characteristic, lines connecting the load to the source, first means connected to said lines for producing a relatively small change in the current in said source and said lines, second means connected to said lines for sensing the source DC current and said change in current, third means connected across said source and sensing said source DC voltage and the change in voltage caused by said change in current, and fourth means connected to said second and third means and connected to said adjustable load to vary said load to maintain the relation $V/I = -\Delta V/\Delta I$, where V and I are the direct current voltage and current of the source, and $\Delta V$ and $\Delta I$ are the changes in the voltage and current.

17. A method of operating a power system at the peak power transfer point, the system including a DC power source having a nonlinear voltage-current characteristic, an adjustable load, and lines connecting the load to the source, said method comprising the steps of sensing the DC voltage and current of the source, inducing a relatively low voltage incremental signal in said source, sensing the incremental voltage and current resulting from said signal in said source, taking the ratio of the incremental voltage and incremental current, said ratio being equivalent to the incremental resistance of the source, taking the ratio of the DC voltage and current of the source, and adjusting the load value to hold said ratios in a predetermined relation where said system operates at the peak power transfer point.

18. The method of claim 17, wherein said predetermined relation is $V/I = -\Delta V/\Delta I$, where V and I are the DC voltage and current of the source and $\Delta V$ and $\Delta I$ are the incremental voltage and current of the source.

19. Apparatus for operating a system at the maximum power point, the system including a DC power source that has a nonlinear voltage-current characteristic, and a variable speed motor, said apparatus comprising first circuit means adapted to be connected across said source and to supply a variable power voltage to the motor, said first circuit means comprising a DC-DC buck converter and adjustment means for varying the voltage to the motor, second circuit means adapted to be connected to said lines and to sense the source DC voltage and current, third circuit means connected to said converter and modulating the duty cycle and therefore the voltage ratio of said converter, said modulation of said converter inducing a relatively small AC current and voltage in said source, fourth circuit means adapted to be connected to said lines and to sense said AC current and voltage, fifth circuit means connected to receive the DC and AC currents from said second and fourth circuit means and connected to said third circuit means for controlling said modulation to maintain the DC current in a predetermined relation to the AC current, and said adjustment means being connected to receive the DC and AC voltages from said second and fourth circuit means and connected to said first circuit means for adjusting said power voltage to maintain the DC voltage in a predetermined relation to the AC voltage.

20. Apparatus according to claim 1, wherein the load includes a variable speed motor, and said fourth means comprises circuit means for varying the motor voltage to control the motor speed.

* * * * *